United States Patent Office 3,043,477
Patented July 10, 1962

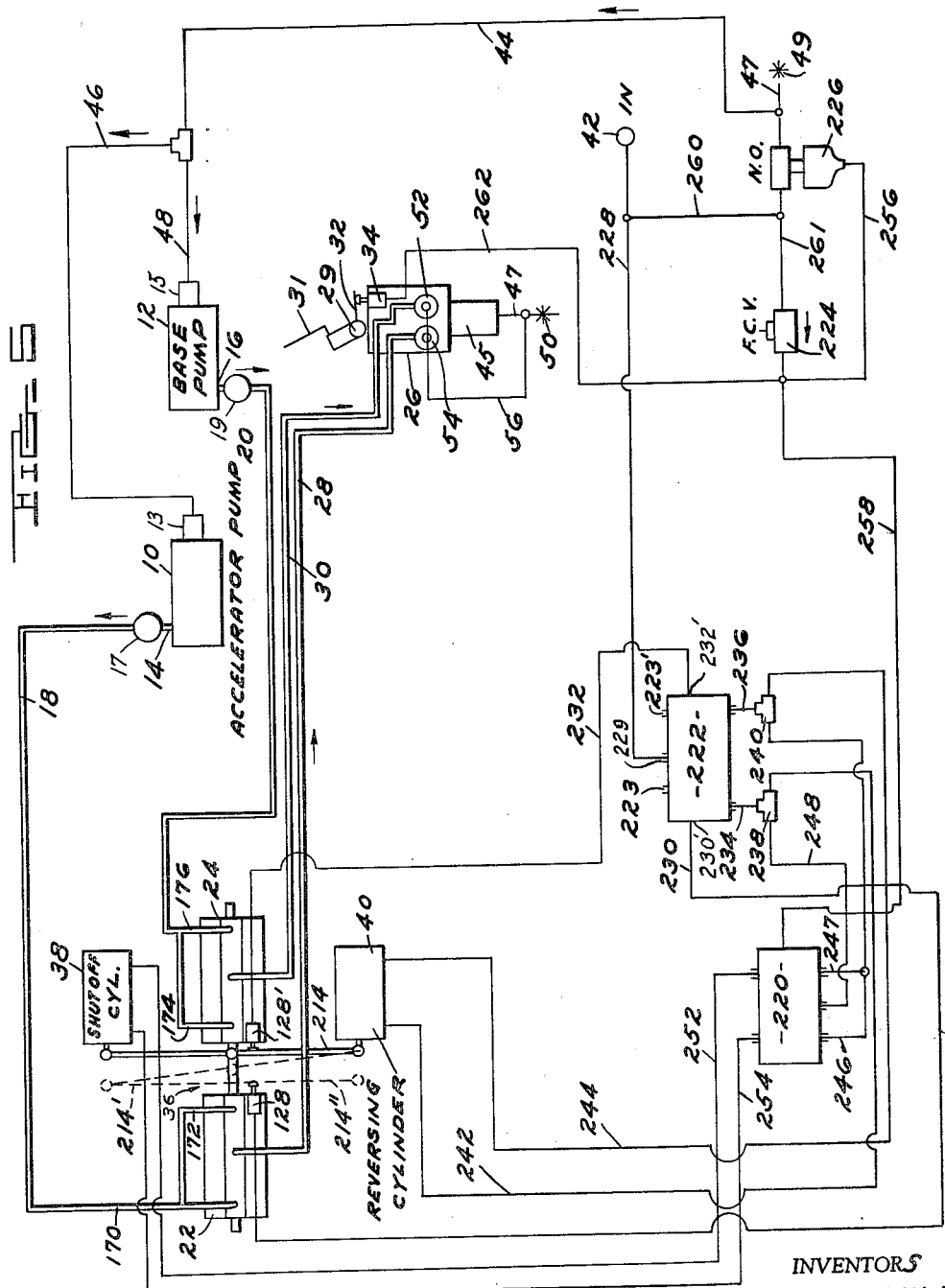

3,043,477
MATERIAL HANDLING SYSTEM, METERING APPARATUS AND METHOD OF METERING AND MIXING MATERIALS
Donald E. Trumbull, Inglewood, Arthur J. Devine, Lawndale, and George S. Pyles, Rolling Hills, Calif.; said Pyles assignor to Pyles Industries, Inc., Detroit, Mich., a corporation of Michigan
Filed Oct. 1, 1959, Ser. No. 843,868
10 Claims. (Cl. 222—1)

This invention relates to a system for simultaneously receiving a plurality of independent liquid or semi-liquid flowable materials and metering or measuring the individual materials in determined relative proportions and delivering them to a device for mixing them in the metered proportions and dispensing them. The invention also relates to improved metering or measuring apparatus for simultaneously metering determined relative proportions of a plurality of materials. The invention has particular utility in the proportional metering of base and accelerator materials for two-part adhesives, sealants, or the like, just prior to mixing and dispensing the materials. These adhesives and sealants, which are a relatively new development, are prepared for use by mixing a base material with an accelerator or curing agent just prior to use. The relative proportions of base material to accelerator must be accurately controlled so that the resulting product will have the requisite curing time, viscosity, subsequent strength, and other properties affected by the relative proportions of the constituents.

Generally the base material may be quite viscous while the accelerator may be quite fluid. Each may be somewhat compressible with the compressibility of one being different from the compressibility of the other. Occasionally the high viscosity will necessitate heating the constituents to reduce the viscosity to a flowable condition. Some base materials may have a viscosity corresponding to that of heavy cream, lubricating oils, or even grease, while the accelerator may approach a viscosity close to that of water.

The constituents of the two-part sealants or adhesives are delivered to the customer in bulk form in two packages or containers, one material in each. The material is then either removed from the containers to individual tanks from which it is pumped, or may be pumped directly from the containers. In either event the material is pumped to a location where it is accurately metered in specified relative proportional amounts as between the base and the accelerator. After metering, the materials are delivered individually to a mixing device where they are intimately intermixed, and thereafter dispensed for use on the customer's job. This invention relates to the system for metering the base and accelerator in the proper porportional amounts and delivering the two metered materials to a device for mixing and dispensing them. It will become apparent, however, as the description unfolds, that the apparatus may be used to proportionally meter any two fluid materials in situations where accurate proportional metering is desired.

The primary object of the invention is the provision of apparatus for the purpose above described which will continuously meter pre-selected proportional amounts of the base and accelerator materials and deliver such metered amounts in the correct proportions to a device for mixing and dispensing the materials, and which apparatus will allow interruption of dispensing of the mixed materials without variation in the relative proportions between metered amounts of the base and accelerator materials yet to be delivered to the mixing and dispensing device.

Another object of the invention is the provision of metering apparatus wherein the relative proportions between the base and accelerator materials may be varied.

Another object of the invention is the provision of metering apparatus adapted to handle two-part adhesive materials and wherein the metering function is accomplished by a pair of positive displacement piston-cylinder combinations so interconnected that the displacement of the piston in one is accompanied by a corresponding displacement of the piston in the other and wherein the movement and displacement of the piston in each is caused by the incoming pressure of the material discharging into the metering cylinders. A concomitant object is a novel mounting and securing of the cylinders so that they may be readily disassembled for changing the relative metering and which mounting and securing will prevent any tendency of warpage or misalignment of the cylinders which would adversely affect the metering function.

Another object of the invention is the provision in apparatus for the purpose above described of a valving arrangement for the control of the admission and discharge of material to each of the metering cylinders so that upon interruption in the discharge of material from the system in which the metering device is disposed, such valving will serve to trap the two-part adhesive materials in the metering device and maintain it at a uniform pressure.

Another object of the invention is the provision of a system for delivering, and metering, materials from a source of supply for such materials, such as containers in which the materials are shipped, to a device for mixing the two materials together and dispensing them for use, and wherein the system is so controlled and valved that upon interruption in the discharge of the mixed materials from the mixing device, the pressure of the two materials in the system is trapped and held static throughout the interruption in the discharge from the mixing device at the same pressure the materials are under during the metering and mixing functions.

Other objects, advantages, and meritorious features will more readily appear from the following description, claims, and accompanying drawings, wherein:

FIG. 5 is a schematic representation of the control system and the fluid pressure lines in which the metering apparatus is disposed;

FIG. 6 is a cross sectional view through the piston shown in the left-hand cylinder assembly in FIG. 2.

Figure 1:
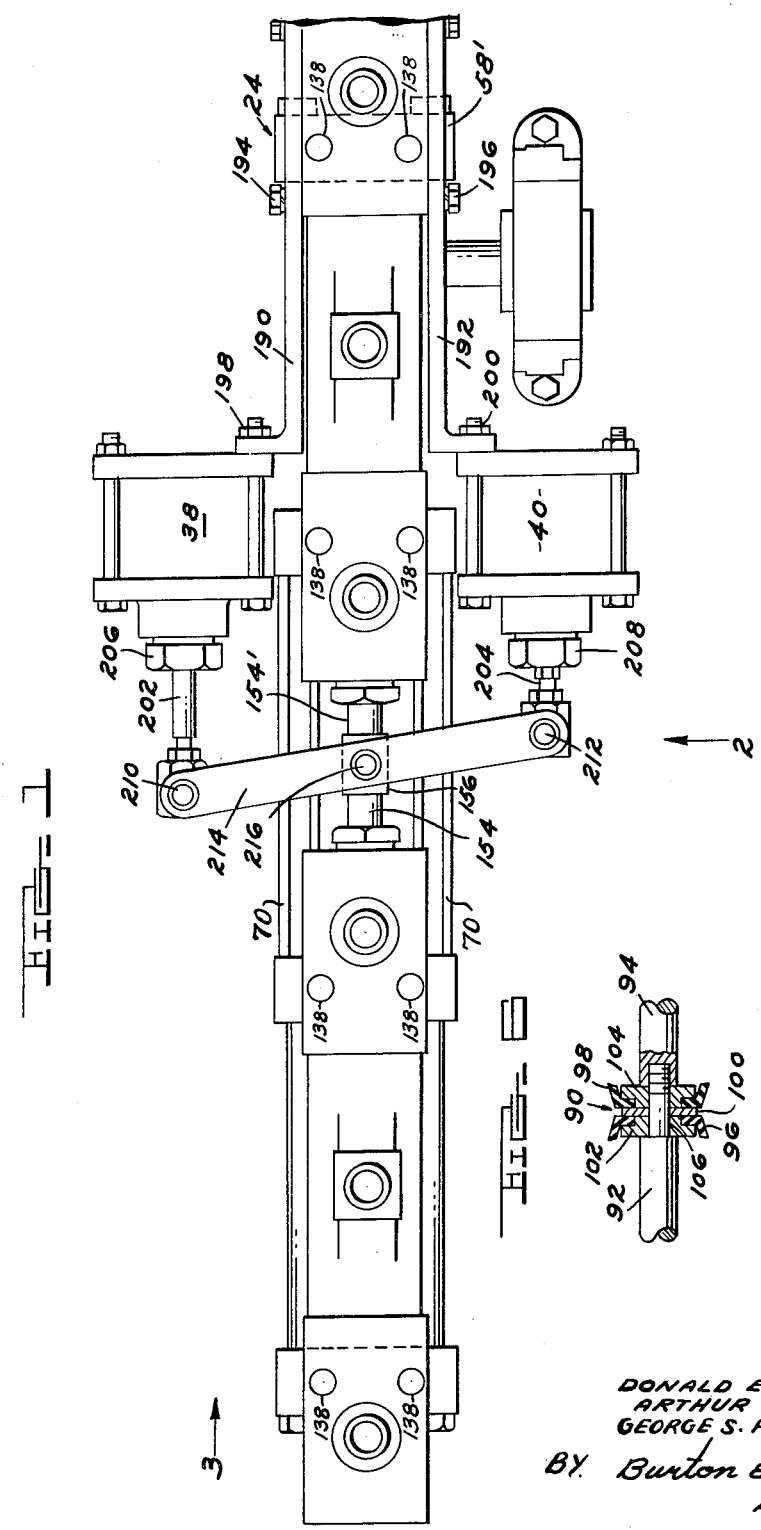
FIG. 1 is a top view of apparatus embodying the metering device.

As shown in FIG. 5 at 10 and 12, a pair of pumps, or what might be termed devices for supplying material under pressure, are adapted to deliver material from discharge ports 14 and 16 in the direction of the arrows through lines 18 and 20 to a pair of metering or measuring cylinder assemblies 22 and 24. In the measuring or metering assemblies the material from the pumps is measured into determined proportional quantities and thereafter discharged to a mixing device 26 in the direction of the arrows through lines 28 and 30. While the mixing device may take any form, the illustrative embodiment of the invention is herein described in connection with a mixer similar to that shown in detail in co-pending application Serial No. 843,823, filed October 1, 1959.

The system of FIG. 5 is actuated by and the operation controlled through the medium of air pressure although it will become apparent to those skilled in the art that such system might be operated hydraulically or electrically.

On the mixing device 26 is a material-dispensing control valve 29. When such valve is open, material in the mixer 26 discharges therefrom, and closure of the valve interrupts dispensing. The valve in the illustrative embodiment is manually operated by spring return lever 31. The lever 31, which is provided with a part 32, serves to open an air control or poppet bleed valve 34 when the lever is swung to a position opening valve 29 for dispensing of the mixed materials from the mixer 26. Opening of valve 34 starts the pumps 10 and 12 and release of the lever 31, closing material dispensing valve 29 and closing air valve 34, serves to stop the pumps. Associated with the metering cylinder assemblies 22 and 24 is a special valving arrangement for controlling the admission and discharge of the materials from lines 18 and 20 and lines 28 and 30. Such valving is generally indicated at 36 and is under the control of a pair of double-acting air cylinders 38 and 40. Air pressure to the system is supplied from any suitable source thereof and enters the system at 42.

The pumps 10 and 12 are of conventional design and need not be described in detail except to point out that they are adapted to receive the respective materials to be pumped and discharge the materials under pressure into the lines 18 and 20. These pumps are designed to handle liquid or fluid material up to a high viscosity and maintain a pressure on such material at any desired amount, such as 100 p.s.i. Each of the pumps is air driven with the air motors 13 and 15 for the pumps receiving air pressure from lines 44, 46, and 48 in the direction of the arrows. Air from the motors exhausts to the atmosphere. Each of the pumps includes a check valve respectively indicated at 17 and 19 which allows the material to be pumped along the lines 18 and 20 out of the pumps but which prevents the material from passing from lines 18 and 20 back through the pumps once the pumps have stopped.

The mixer 26 is provided with an air motor 45 for driving the same, air being supplied to the motor by line 47 which, for convenience of illustration in FIG. 5, is assumed to extend between the asterisks 49 and 50. The mixer also includes an air-operated valve for each of the lines 28 and 30, valve 52 controlling the admission of material from line 30 to the mixing chamber within the mixer and valve 54 similarly controlling the admission of material from line 28. Air pressure to open these valves is supplied by lines 47 and 56. Upon pressurization of line 47 the air motor 45 is started and at the same time valves 52 and 54 open to admit the materials to the mixing chamber of mixer 26.

The air control system, whose operation is more particularly described hereinafter, is so arranged that upon swinging of lever 31 to allow dispensing of mixed material from the mixer 26, the air motor 45 is started, valves 52 and 54 open, valve mechanism 36 is shifted to allow metering and pumps 10 and 12 are started. Upon reverse swinging of lever 31 to close dispensing valve 29, motor 45 stops, valves 52 and 54 close and valve mechanism 36 is shifted to stop metering and prevent entry or discharge of materials to or from the metering assemblies 22 and 24 to trap the mixed material in the mixing chamber of the mixer and between the mixer and the metering apparatus in lines 28 and 30 at substantially the line pressure of the materials existing in lines 28 and 30 during the mixing and dispensing operation, and stop pumps 10 and 12 to trap material in lines 18 and 20 between the pumps and the metering cylinders at substantially the same pressure as exists during operation of the pumps.

Figure 2:
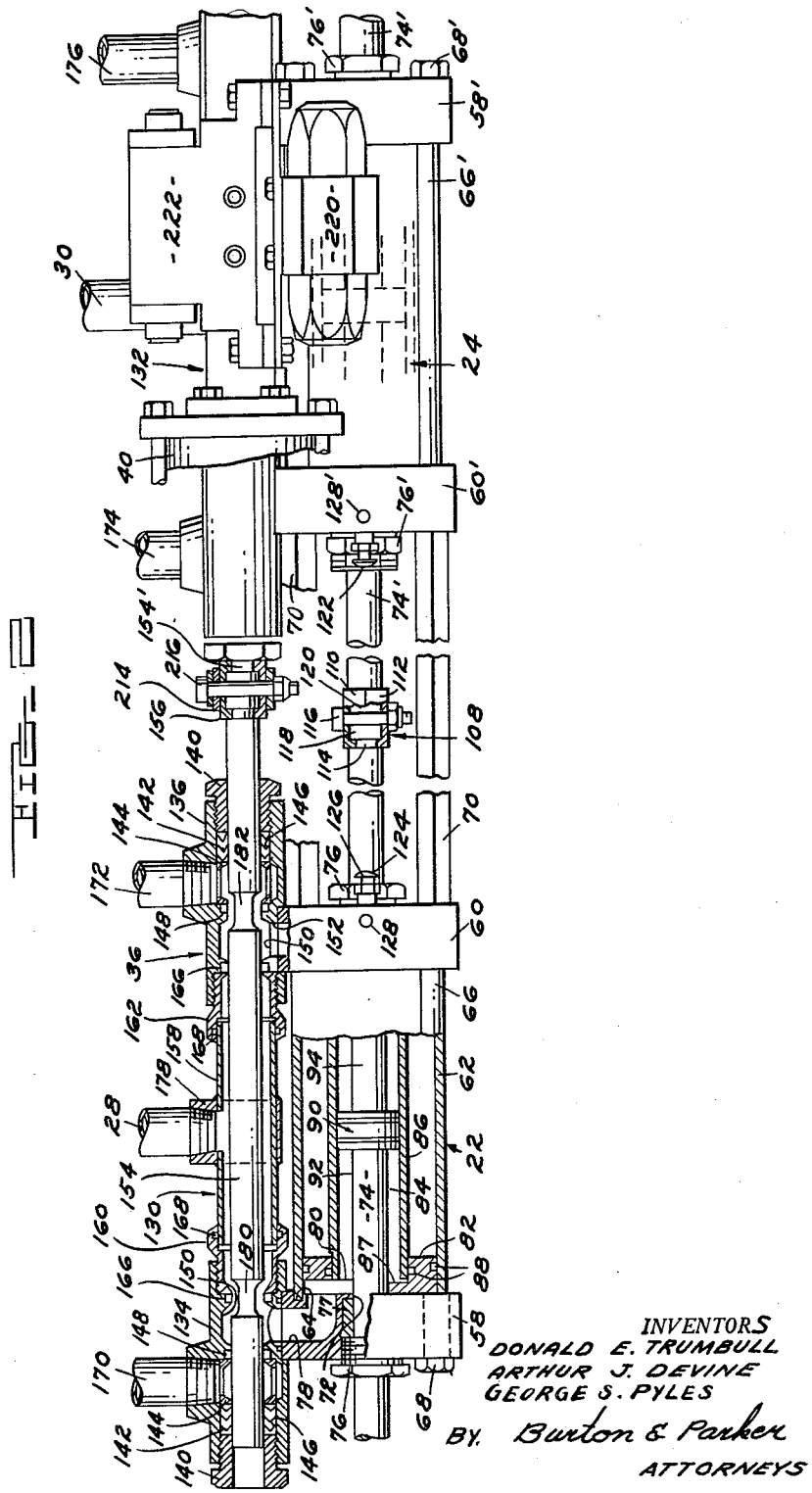
FIG. 2 is a cross sectional view looking in the direction of the arrow 2 in FIG. 1, but with certain parts broken away for clarity.
Figure 3:
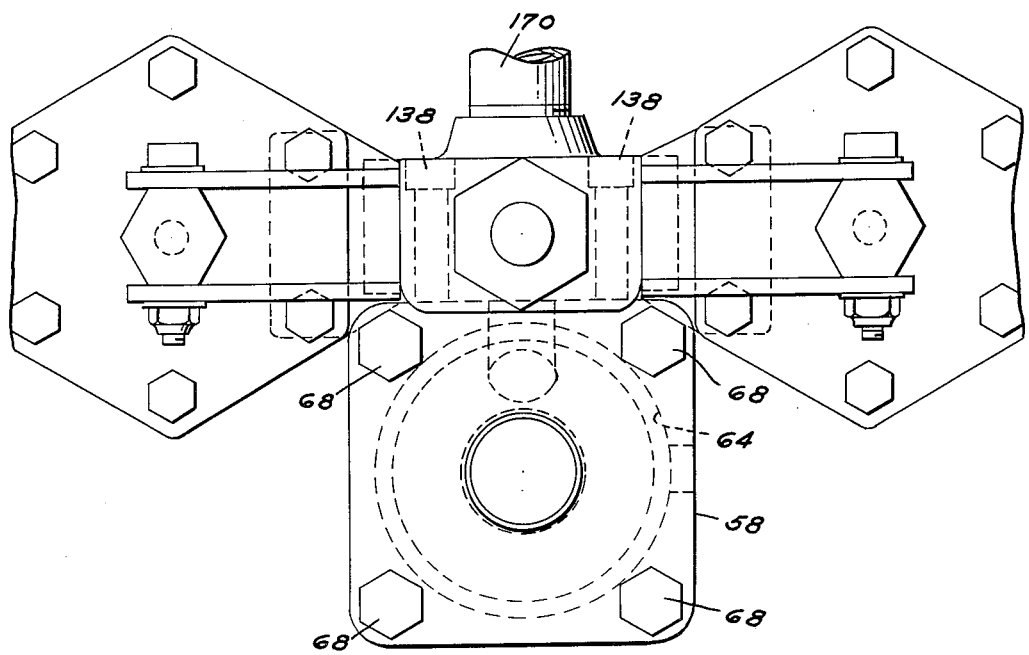
FIG. 3 is an end view of the apparatus shown in FIG. 1 looking in the direction of arrow 3 in FIG. 1.

Referring now to FIGS. 1-4, inclusive, the metering device, which is supported in any convenient fashion, includes the metering cylinder assemblies 22 and 24 which are disposed in coaxial spaced-apart alignment. They are of similar construction and therefore a description of assembly 22 will suffice for both. Assembly 22 includes a pair of opposed cylinder heads 58 and 60 spaced apart by a cylindrical enclosure 62 received in an annular slot 64 in each cylinder head. The two cylinder heads are tensioned toward each other by the bolts 66 which extend therebetween. The heads 68 of the bolts overlie the outboard cylinder head 58 while the opposite end of the bolt is threaded into a spacing member 70 which extends between the cylinder assemblies and holds them in coaxial spaced-apart relation. There is one spacer member 70 for each of the bolts 66, and as shown in FIG. 3, four bolts 66 are provided. Those parts of cylinder assembly 24 corresponding to parts of assembly 22 are primed.

The cylinder heads 58 and 60 are of like internal construction and therefore a description of head 58 will suffice. The head is provided with a central piston rod receiving aperture 72 through which the piston rod 74 extends with a gland nut 76 compressing packing 77 preventing the escape of material around the rod. Cylinder head 58 also includes an internal passage 78 through which material may enter and leave the interior of the cylinder assembly. Passage 78 communicates through passage 80 in a secondary cylinder head 82 with the interior 84 of the metering cylinder 86 which is housed and sealed within the cylinder assembly in coaxial alignment with the cylindrical enclosure 62.

Secondary cylinder head 82 abuts the inner face of the head 58. It is provided with O-ring seals or the like 88 which serve to prevent the escape of material within the metering cylinder 86 outwardly of the cylinder assembly 22. The left-hand end (FIG. 2) of the metering cylinder 86 is spaced from the opposed surface 87 of the secondary cylinder head 82 when the head 58 is clamped securely against the casing 62. This slight spacing of the end of the metering cylinder from the face 87 of the secondary head allows expansion and contraction of the metering cylinder in the event of temperature changes and assures that the metering cylinder will not be placed under axial compression as a result of the cylinder head 58 being tightened against the cylindrical casing 62. In other words, the secondary cylinder head 82 forms a floating seal with the left-hand end of the metering cylinder 86.

The secondary cylinder head 82 at each end of each metering cylinder assembly, as well as the metering cylinder 86, may be removed from the metering assembly 22 for replacement with secondary cylinder heads and metering cylinders of different diameters to allow for changing the proportion between the materials being metered. Such removal of the secondary cylinder heads and metering cylinders is accomplished by the removal of the primary cylinder heads 58 and 60 and the withdrawal of the secondary heads and metering cylinders from the interior of the assembly 22 in a manner which will be apparent from a study of the drawings.

The piston rod 74, which extends completely through the assembly 22 to project beyond the left-hand end thereof, as shown in FIG. 2, is provided with a piston 90. The piston is shown in detail in FIG. 6. Piston rod 74 is similar to piston rod 74'. Rod 74 comprises two parts, 92 and 94, which are threadedly connected as shown in FIG. 6. Disposed between the opposed ends of portions 92 and 94 are a pair of Teflon or the like wiping washers 96 and 98 separated by a metal washer 100 and held in a radially expanded position by metal inserts 102 and 104. The Teflon washers wipe the inner cylindrical surface of the metering cylinder 86. The washers comprising the piston 90 are supported upon a reduced diameter portion 106 of the rod portion 92 and are held together by the opposed shoulders of the portions 92 and 94 as shown in FIG. 6.

Figure 4:
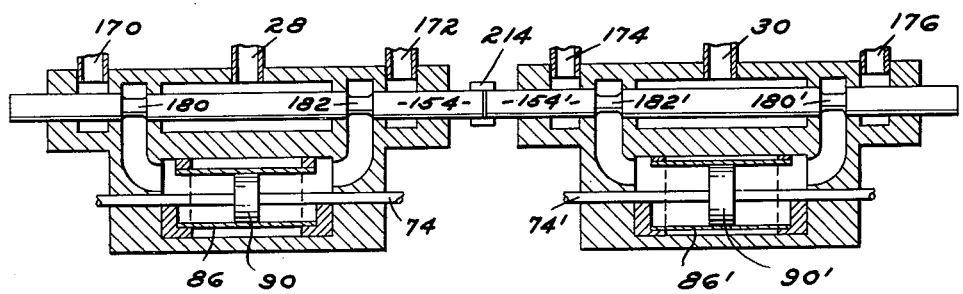
FIG. 4 is a schematic view of the valve mechanism for controlling the admission and discharge of the materials to and from the metering cylinders.

The metering cylinder of the cylinder assembly 24 is shown schematically in FIG 4 at 86'. It is in all respects similar to cylinder 86 except with regard to its diameter which may vary from the diameter of cylinder 86 unless the proportion of materials to be metered is 1 to 1, in which event the diameters of the metering cylinders will be equal. It will be noted that to vary the relative proportions of the two materials being metered, a replacement of the metering cylinders and the secondary cylinder heads and the pistons 90 and 90' will be required. It is entirely possible that in many instances only metering cylinder 86, the secondary heads and piston associated therewith need be changed to vary the relative metered proportions of the two materials the desired amount.

The piston rods 74 and 74' are coupled together by a coupling 108 which consists of similar upper and lower halves 110 and 112. The halves are held toward each other and within annular slots adjacent the ends of the piston rods, such as slot 114 shown in FIG. 2, by a bolt 116 which passes through the halves clamping them together. The shank of the bolt extends between the ends of 118 and 120 of the piston rods. The construction is such that slight misalignment of the piston rods 74 and 74' is allowed in the coupling while relative axial shifting between the rods is prevented.

Mounted on cylinder heads 60 and 60' are poppet valves 122 and 124. The poppets are actuated by a corner of the coupling 108 striking the actuating button 126 of each upon reciprocation of the piston rods. Upon depression of the button 126 of each valve, air communicating with the valve through a small passage in the cylinder heads 60 and 60', the port of which is indicated at 128 and 128', is allowed to escape to the atmosphere. These poppet valves are of conventional construction and need not be described in detail.

As shown in FIG. 3, the cylinder head 58 is generally square as is each of the other cylinder heads. Mounted upon the flat upper surface of the cylinder heads is the valve assembly for controlling the admission and discharge of the materials to be metered to and from the metering cylinders. Such valve mechanism generally indicated at 36 in FIG. 2 comprises a pair of coaxially aligned spool valve assemblies 130 and 132, one for each of the metering cylinders. The spool valve assemblies are of identical but reverse construction and therefore a description of one will suffice for both. The valve assembly 130 and its counterpart 132 includes a pair of manifolds 134 and 136 which are bolted as at 138 to the top of each of the heads 58 and 60. Each manifold is closed at its outer ends by a gland nut 140 which compresses packing material 142 against an apertured insert 144. The insert 144 is received within a cylindrical bore 146 in each of the members 134 and 136 and is held by the packing against a shoulder containing an O-ring seal or the like 148. Inwardly of the seal 148 is a bore portion 150 which communicates through a port 152 with the passageway 78 in each of the heads 58 and 60.

Extending in coaxial alignment through the manifold members 134 and 136 of each of the assemblies 130 and 132 is a spool type valve rod. The valve rod in assembly 130, indicated at 154, is coupled by a coupling 156 which is similar in construction to coupling 108 heretofore described, to a spool valve rod 154' extending into the valve assembly 132. Enclosing the valve rod 154 and extending between the manifolds 134 and 136 and establishing communication therebetween is a cylindrical conduit 158 which is sealingly floatingly received by couplings 160 and 162, each having an O-ring seal or the like 168 in engagement with the outer surface of the conduit, respectively, threadedly received, in manifolds 134 and 136. Couplings 160 and 162 bottom within the manifolds against shoulders therein provided with O-ring or the like seals 166 which establish sealing connection with the valve rod in certain axially shifted positions thereof.

Threadedly received within the manifold members 134 and 136 are the material delivery pipes 170 and 172 which communicate with the pipe 18 leading from the accelerator pump 10. Pipes 174 and 176 communicate similar to pipes 172 and 170, respectively, with the interior of the valve assembly 132 and are in communication with the material delivery line 20. Sealingly received over conduit 158 is a sleeve 178 having a boss within which is threadedly received pipe 28. Pipe 28 communicates through the boss in sleeve 178 with the interior of the conduit 158. Pipe 30 is similarly connected to a corresponding conduit in the valve assembly 132.

The spool rods 154 and 154' are each provided with a pair of reduced diameter portions such as at 180 and 182 in the rod 154. Such reduced diameter portions, when the spool rod 154 is in the position shown in FIG. 2, will establish material communication between the pipe 28 and the left-hand end of the metering cylinder 86, and material communication between pipe 170 and the right-hand end of metering cylinder 86. The reverse condition will occur when the spool rod 154 is shifted to the extreme left-hand position. Three positions of the spool rods 154 and 154' are intended. One of such positions is shown in FIG. 4 where the spool rods are in what may be termed a neutral position and in such position the spool rods prevent entry or discharge of material to or from the metering cylinders. The second position which the rods may assume is indicated in FIG. 2 where they are shifted to the extreme right to establish communication of the left-hand assembly, as aforesaid. In such position rod 154' will place line 176 in communication with the right-hand end of metering cylinder 86' and line 30 in communication with the left-hand end of metering cylinder 86' and will block the discharge of material from line 174 as well as preventing communication between line 30 and the right-hand end of the metering cylinder. The third position which the spool rods may assume is the extreme left-hand position wherein pipes 170 and 174 are respectively in communication with the left-hand ends of cylinders 86 and 86' and pipes 28 and 30 are respectively in communication with the right-hand ends of cylinders 86 and 86' and communication is blocked between pipes 172 and 176 respectively with the right-hand ends of cylinders 86 and 86' and communication is also blocked between pipes 28 and 30 with the left-hand ends of cylinders 86 and 86' respectively. When the spool rods are in either the extreme right or extreme left-hand positions, the metering device is operating to meter material but when the spool rods are in the neutral position shown in FIG. 4, the metering device will be held inoperative.

Means are provided for shifting the spool rods between the aforesaid positions. Such means serves not only to shift the rods between the extreme right and left-hand positions in a reciprocating fashion during continuous metering by the apparatus but also serves, upon signal, to shift the spools to the neutral position to interrupt the metering operation. Such means comprises a pair of double-acting air cylinders heretofore mentioned and indicated at 38 and 40. The cylinders are shown in FIG. 1 mounted upon a pair of brackets 190 and 192 which are bolted or otherwise secured as at 194 and 196 to the right-hand metering assembly 24. The cylinders are bolted to the brackets as at 198 and 200. The cylinders are of conventional double-acting design. Within the cylinders are piston rods 202 and 204 which extend outwardly therefrom through suitable packing glands 206 and 208. Pistons (not shown) on the inner ends of the piston rods cooperate with the interior of the cylinders. The outer end of each rod is pivotally connected as at 210 and 212 to opposite ends of a shift strap 214. Intermediate the length of the strap 214 it is pivotally connected by the bolt 216 to the coupling 156 which secures together opposite ends of the spool rods 154 and 154'. With the piston rods 202 and 204 in either the position shown in FIG. 1 or in the reverse position wherein rod 204 is extended and rod 202 is retracted, the valve spool rods will be in the aforementioned neutral position. When piston rods 202 and 204 are both either in the extended position or the retracted position, the spool rods will be in an operative position to cause operation of the metering apparatus, i.e., the valve assemblies 130 and 132 will allow entry of material to the metering assemblies and discharge of metered amounts to the mixer.

The automatic pneumatic control system is schematically shown in FIG. 5. Among other things it includes valve means in flow controlling communication between the source of the materials to be mixed and the inlet side of the metering means, namely, the check valves at the base and accelerator pumps and the valve assembly 36. Such control system also includes valve means between the metering assembly and the mixer, namely, the valve assembly 36 and the valves 52 and 54. The control system also includes a valve 29 at the discharge side of the mixer. The aforesaid valve means allows flow of materials from the pumps to the meter, through the meter and on to the mixer, through the mixer and out of the mixer. Such valve means will also serve to prevent flow between the pumps, metering device and mixer, trapping material between the pumps and the metering device, and within the metering device, between the metering device and the mixer, and within the mixer, at the flow pressure of the materials through the system.

More specifically, the control system includes a pair of air-actuated valves 220 and 222, and adjustable flow control valve 224, and a normally open pilot valve 226. As before mentioned, air pressure enters the control system at 42, and by line 228 is led to an inlet port 229 of valve 222. Valve 222 has exhaust ports 223 and 223', a pair of bleed ports 230' and 232' to which are respectively connected the lines 230 and 232 which communicate, in turn, with the poppets 128 and 128'. Lines 234 and 236 connected to ports of valve 222 branch at T's 238 and 240 to communicate with opposite ends of valve-shifting cylinder 40 by way of lines 242 and 244, and communicate with ports of valve 220 by way of lines 246, 247, and 248. Control lines 252 and 254 connect ports of valve 220 with opposite ends of valve-shifting cylinder 38.

Valve 220 is a spool type valve of conventional design. The spool within the valve is shifted by a spring in one direction, when air pressure in line 258 drops, to establish communication between lines 248 and 254, 247 and 252, while line 246 is blocked at the valve, and shifted in the opposite direction against the spring tension by air pressure acting against the spool and entering through line 258 to establish communication between lines 254 and 246 and between lines 252 and 248, while line 247 is blocked at the valve.

Valve 222 is a spool type valve of conventional construction. The spool within the valve, upon depression of poppet 128 to bleed air from line 230, will shift to a position such that line 236 is connected to line 228 and line 234 is connected to exhaust port 223', while if instead poppet 128' is depressed to bleed line 232, the spool will be shifted to a position connecting line 234 to line 228 and line 236 will be connected to exhaust port 223. The spool will remain in the position to which shifted following closure of the poppet and will thereafter shift upon opening of the other poppet.

To close normally open valve 226, line 256 is tapped into line 258 beyond the flow control valve 224 and communicates with the air motor which operates valve 226 to close it. Line 258 communicates at opposite ends with the pilot valve 220, as aforementioned, and with the flow control valve 224. Line 262 establishes communication between line 258 and poppet valve 34. Flow control valve 224 receives air from source 42 by lines 260 and 261, the latter connecting with line 46 through the normally open valve 226.

The operation of the control system is as follows, assuming the system is in the midst of metering and mixing and dispensing material and the metering pistons 90 and 90' are moving from right to left, as viewed in FIGS. 2, 4, and 5, with the strap 214 in the solid outline position shown in FIG. 5. (Valve 29 (FIG. 5) will be open to allow the material being mixed in mixer 26 to discharge therefrom. Poppet 34 will be open to bleed line 262 which will cause a pressure drop in lines 258 and 256 as a result of the air discharging to the atmosphere through the poppet faster than it flows through the preliminarily adjusted flow control valve 224. The reduced pressure in line 256 allows valve 226 to open to pass air pressure to the mixer motor 45 and the motors of pumps 10 and 12. With the drop in air pressure in line 258, the spool of valve 220 will have shifted to place line 247 in communication with line 252 and line 248 in communication with line 254, while line 246 is blocked at the valve. Because poppet 128' was opened just before the pistons 90 and 90' started their stroke from right to left, this bled the air pressure in line 232 such that the spool in valve 222 shifted to connect line 228 to line 234 and line 236 to exhaust port 223'. Consequently, with these line connections across valves 220 and 222, the left end of cylinders 38 and 40 are pressurized while the right-hand ends are on exhaust, and strap 214 is in the solid outline position shown in FIG. 5.

If the operator now closes valve 29 to interrupt the dispensing of material from mixer 26, poppet 34 will be closed, raising the pressure in lines 258 and 256, in turn closing valve 226 to stop the mixer and pump motors. With a higher pressure in line 258, the spool of valve 220 is shifted to a position connecting line 248 with line 252 and line 246 with line 254, which reversely pressurizes cylinder 38, and strap 214 is shifted to the phantom outline position 214' shown in FIG. 5 and the position shown in FIG. 1. This is the "neutral" position of valve mechanism 36 in which the flow of materials to and from the metering cylinders is blocked, the spool valve rods 154 and 154' being in the positions shown in FIG. 4.

When the operator again swings lever 31 to open valve 29, line 258 will be vented to the atmosphere causing shifting of the spool in valve 220 to re-establish direct communication between line 248 and line 254, and line 247 and line 252, so that cylinder 38 is reversely pressurized to shift piston rod 202 back into the cylinder so that the strap 214 again assumes the position shown in FIG. 5. The pump motors and mixer motor 45 are also started. As the metering piston rods 74 and 74' approach the extreme left-hand position the coupling 108 contacts poppet 128 serving to open the same to place line 230 in communication with the atmosphere. With line 230 vented to the atmosphere the spool in valve 222 now shifts to place line 228 in communication with line 236 while line 234 is vented connected to exhaust port 223. This causes both cylinders 238 and 40 to shift their piston rods outwardly, moving the strap from the position shown in FIG. 5 to the position 214″ spaced to the left as shown in phantom outline. The metering cylinders now reverse their direction of movement and the metering operation continues. If valve 29 is closed as pistons 90 and 90' are moving from left to right, the system will stop, as will be apparent from the foregoing description.

It will be noted that when valve 29 is closed, the control system serves to shut the material control valves 52 and 54 as well as block entry or discharge of material to and from the metering cylinders. Also, the pumps 10 and 12 are turned off so that their respective check valves, hereinbefore mentioned, will serve to prevent reverse flow of material back along lines 18 and 20 into the source for the material from which the pumps were drawing the same. As a result, the material in the material delivery lines, in the metering apparatus and in the mixer is held under substantially the same pressure during an interruption in the metering operation as the pressure during the metering operation. This prevents inaccuracies in the metering function because the pressure on the material remains unchanged and the conditions are held static. Surging of the material when operation of the system is re-continued, variation in volume of materials through compression thereof or through expansion of material delivery lines, et cetera, is avoided by holding the pressure static in all parts of the system during interruption of material dispensing and by holding the pressure substantially equal to that existing during dispensing.

What we claim is:

1. A system having the capability of continuously proportionally metering and mixing at least two flowable materials comprising, in combination: a source of each material under pressure; proportional metering means for simultaneously receiving the materials and concurrently proportionally metering and discharging them; a mixer for simultaneously receiving, mixing together, and dispensing the metered materials; said metering means having inlet and discharge ports for each individual material; said mixer having an inlet port for each individual material and a discharge port for the mixed materials; means coupled with and extending between the source of materials under pressure and the metering means and cooperating with said inlet ports of the latter to define flow-communicating passageways for conducting the material independently from the source thereof to the metering function of the metering means; means coupled with and extending between said metering means and mixer and cooperating with the discharge ports of the former and the inlet ports of the latter to define flow-communicating passageways for conducting the materials independently of each other from the metering means to the mixer; first valve means for controlling the flow through the inlet and discharge ports of the metering means, second valve means for controlling the flow through the inlet ports of the mixing means, third valve means controlling the flow at the discharge port of the mixing means; and control mechanism operatively connected with all said valve means to open them simultaneously, thereby allowing flow through the passageways the metering means and the mixing means, or to close them simultaneously, thereby trapping material in the passageways and in the metering means and in the mixer at the flow pressure.

2. A system having the capability of continuously proportionally metering and mixing at least two flowable materials comprising, in combination: a source of each material under pressure; a mixer for mixing together the materials and having inlet and discharge sides; proportional metering means, having an inlet side communicatively coupled to the source for each material and a discharge side communicatively coupled to the inlet side of the mixer, for simultaneously receiving the materials from said source and concurrently proportionally metering and discharging them to the mixer; first valve means in flow-controlling communication between the source for said materials and the inlet side of the metering means, second valve means in flow controlling communication between the discharge side of the metering means and the inlet side of the mixer; and control mechanism operatively connected to the first and second valve means to open them simultaneously thereby allowing flow through the metering means and through the mixer for discharge from the latter, or to close them simultaneously, thereby trapping material at the flow pressure between the source thereof and the metering means and within the metering means and between the metering means and the mixer to maintain constant the relative pressures and proportions of materials.

3. A system having the capability of continuously proportionally metering and mixing two flowable materials comprising, in combination: a pair of material pumps, one for each part of the material; a check valve coupled to the discharge of each pump to allow discharge from the pump but prevent reverse flow into the pump; means for proportionally metering the two materials, and including a pair of communicatively independent double-acting cylinder and piston assemblies having inlet and discharge ports at opposite ends of each assembly; synchronizing means coupled to and extending between the assemblies to ensure joint uniform reciprocation of each; a mixer having a pair of inlet ports and a discharge port; three-position valve means coupled in flow communication between the discharge side of the check valves and the ports of the metering means and the inlet ports of the mixer and including communicatively independent valving functions for each part of the material, said valve means shiftable from a position simultaneously admitting the two parts of the material to complementary ends of the assemblies and discharging the parts in the assemblies to the mixer, to a position simultaneously admitting the two parts to opposite ends of the assemblies and discharging the two parts in the assemblies to the inlet ports of the mixer, said valve means shiftable to a neutral position to prevent entry or discharge of parts of the materials to or from the assemblies; second valve means at each inlet port of the mixer to admit or prevent entry of the two parts to the mixer; motor means coupled to the pumps for operating the same; third valve means in flow-controlling communication with the discharge port of the mixer; and a control system coupled to said motors and to said valve means to shift the three-position valve means to the neutral position and close the second valve means and stop the motors substantially simultaneously at the closure of said third valve means.

4. The invention as defined in claim 3 characterized in that said control system is coupled to said synchronizing means to shift the three-position valve between the two first-mentioned positions upon completion of each stroke of the assemblies.

5. Metering apparatus for plural-part flowable materials comprising, in combination: a cylinder for each of the materials closed at opposite ends and disposed in axially spaced-apart coaxial alignment; tie rod means disposed in spaced circumaxial relation about the axes of the cylinders and extending axially between the cylinders and connected to the cylinders to hold them rigidly in the aforesaid relative positions; at least one of said cylinders having a removable cylinder liner; a piston in each cylinder; a piston rod connected to each piston and extending coaxially through opposed ends of the cylinders and secured together for joint reciprocation of the pistons; a port at opposite ends of each cylinder; a three-position valve at each of said ports with the valves communicatively independent and operatively connected together for conjoint operation; and control means coupled to the valve means and responsive to the strokes of the pistons to shift the valve means between two positions to alternately admit materials to opposite ends of the cylinders and simultaneously allow discharge of materials from the other ends of the cylinders, and said control means including valve shifting mechanism operable independently of the stroke of the pistons to shift the valve means to a third position preventing all entry or discharge of materials to and from the cylinders.

6. In a system for metering plural-part flowable materials including a source for each material under pressure: a plurality of axially spaced-apart and axially aligned communicatively independent positive displacement cylinder-piston assemblies of predetermined relative volumetric capacities having coaxially aligned and connected piston rods; valve means communicatively coupled to opposite ends of each cylinder-piston assembly with the valve means for each cylinder adapted to be coupled to one of said sources of material under pressure; each valve means being communicatively independent of the other valve means; valve-shifting means coupled to each said valve means and responsive to each stroke of the cylinder-piston assemblies to actuate such valve means to direct the material under pressure from said sources to the opposite and complementary ends of the cylinder-piston assemblies to shift the pistons therein in the opposite direction and allow discharge of material in the cylinder-piston assemblies out of the assemblies; and said valve-shifting means including mechanism selectively operable independently of the strokes of the cylinder-piston assemblies to shift each said valve means to prevent all material flow to or from the assemblies.

7. In a system for metering plural-part flowable materials including a source for each material under pressure: a plurality of axially spaced-apart and axially aligned positive displacement cylinder-piston assemblies of different volumetric capacities having coaxially aligned and connected piston rods; spool type valve means communicatively coupled to opposite ends of each cylinder-piston assembly and having coaxially aligned and connected spools; a member extending transversely of the spools and pivotally connected thereto; a pair of reciprocating motors with one connected to each end of said member; a control system coupled to said motors and responsive to the reciprocation of the pistons in each assembly to actuate the motors and simultaneously shift said member uniformly axially of the spools and move the spools between two axial limits of travel and thereby alternatively reversely pressurize complementary ends of the cylinder-piston assemblies, and said control system operable independently of the strokes of the cylinder-piston assemblies to cause only one of the motors to shift the connected end of the member in the opposite direction and move the spools into a position intermediate opposite limits of travel to prevent entry of discharge of material to and from the assemblies.

8. That method of metering and mixing plural-part flowable materials comprising: placing each part to be metered and mixed under pressure sufficient to cause it to flow, delivering the plural parts of the material under such pressure to a metering station, proportionally metering the plural parts of the material in the station, discharging the metered parts of material from the station at volumetric proportions directly related to the metered proportions and delivering the metered parts to a mixer, mixing the plural parts in the metered proportional quantities and discharging them from the mixer, interrupting discharge of mixed materials from the mixer and simultaneously trapping and holding the plural parts of the material under said pressure in separate and communicatively independent areas between the source of the parts under said pressure and the metering station and within the metering station and between the metering station and the mixer and within the mixer.

9. In a system for proportionally metering and mixing plural flowable materials: sources of the materials under pressure; a mixing device having inlet and discharge ports; a double-acting metering device for receiving each of the materials and proportionally metering and discharging them and having inlet and discharge ports coupled respectively to said sources and to said mixing device; three-position valve means communicating with the inlet and discharge ports of said metering device and shiftable between two positions admitting materials to the metering device and discharging metered amounts of material therefrom, and shiftable to a third position preventing entry or discharge of materials to or from the metering device; valve means at the sources of said materials and at the mixing device inlet and discharge ports; and means coupled to all of said valve means and responsive to opening of the valve means at the discharge port of the mixing device to open the remaining valve means and shift said three-position valve means to either of said two positions, and responsive to closing of the valve means at the discharge port of the mixing device to close the remaining valve means and shift the said three-position valve means to said third position whereby material is trapped and held at the flow pressure between said sources within the metering device and between the metering device and the mixing device and within the mixing device.

10. Metering apparatus for plural-part flowable materials comprising, in combination: a metering cylinder for each of the materials closed at opposite ends; a piston in each cylinder; a piston rod removably coupled to each piston and extending through an end of the cylinder; means coupling the piston rods for synchronous movement; said pistons cooperating with the cylinders to displace predetermined relative volumes of material from the cylinders; each cylinder having removable cylinder liners whereby the relative displacement of the cylinders may be varied, each cylinder having material flow ports at opposite ends; a three position first valve means coupled in fluid-controlling communication with said ports of one cylinder, a three position second valve means communicatively independent of the first valve means and coupled in fluid-controlling communication with said ports of the other cylinder, control mechanism operatively coupled to both said valve means and responsive to reciprocation of said pistons to shift simultaneously both valves between two positions to admit and discharge material to and from opposite ends of the cylinders, and said control mechanism including a portion operable independently of said pistons to shift simultaneously both said valve means to a third position totally blocking entry or discharge of materials to or from the cylinders, whereby materials in the cylinders are held at the normal flow pressure when flow is interrupted.

References Cited in the file of this patent
UNITED STATES PATENTS

| | | |
|---|---|---|
| 352,482 | Moore | Nov. 9, 1886 |
| 990,264 | Hertzberg | Apr. 25, 1911 |
| 1,457,505 | Curran | June 5, 1923 |
| 2,188,258 | Zinkil et al. | Jan. 23, 1940 |
| 2,558,628 | Redin | June 26, 1951 |
| 2,575,305 | Stryzakowski et al. | Nov. 13, 1951 |
| 2,673,012 | Harrington | Mar. 23, 1954 |
| 2,667,129 | Graner | Jan. 26, 1954 |
| 2,675,946 | Strempel | Apr. 20, 1954 |
| 2,788,953 | Schneider | Apr. 16, 1957 |
| 3,005,576 | Trautmann et al. | Oct. 24, 1961 |

OTHER REFERENCES

Kickbusch, German application, Serial No. K23,761, printed November 3, 1955 (Kl 64c Gr. 2902).